March 26, 1963  R. J. DAY  3,082,882
CENTRAL BUFFING AND DRAFT GEAR
Filed June 10, 1960  3 Sheets-Sheet 1

INVENTOR
Richard John Day
BY
Shoemaker and Mattare
ATTORNEYS

March 26, 1963 R. J. DAY 3,082,882
CENTRAL BUFFING AND DRAFT GEAR
Filed June 10, 1960 3 Sheets-Sheet 2

INVENTOR
Richard John Day
BY
Shoemaker and Mattare
ATTORNEYS

March 26, 1963 R. J. DAY 3,082,882
CENTRAL BUFFING AND DRAFT GEAR
Filed June 10, 1960 3 Sheets-Sheet 3

INVENTOR
RICHARD JOHN DAY
BY
Shoemaker and Mattare
ATTORNEYS

United States Patent Office 3,082,882
Patented Mar. 26, 1963

3,082,882
CENTRAL BUFFING AND DRAFT GEAR
Richard John Day, Bath, England, assignor to The Avon India Rubber Company Limited, Melksham, England, a British company
Filed June 10, 1960, Ser. No. 35,314
4 Claims. (Cl. 213—49)

This invention relates to central buffing and draft gear for railway and like vehicles, more especially of the kind comprising a hydraulic or oleo unit and a resilient e.g., rubber spring arrangement situated between the centre sills so as to cushion both buffing and draft shocks.

In the specification of our patent application Serial No. 797,396, now Patent Number 3,031,089 there is described central buffing and draft gear including steel, rubber or other resilient springs located between the centre sills of the vehicle and having front and rear followers, the front follower of the resilient spring acting as the rear follower or baseplate for the hydraulic or oleo unit or oleo pneumatic buffing system, and the present invention is concerned with improvements in such buffing and draft gear.

The present invention employs rubber or other resilient units, and hydraulic units in parallel for both buffing and draft, either throughout the stroke, or with an initial stroke cushioned only by the rubber or resilient units, and utilizes resilient units as the recoil medium for the hydraulic system.

Preferably, initial buffing and draft shock is taken by the rubber or other resilient springs, and after a predetermined stroke the shock is shared by the resilient and hydraulic units working in parallel.

Conveniently also, the resilient springs each comprise a column of units, each unit consisting of suitably circular metal plates with bars or concentric rings of rubber projecting from each face, separating plates suitably of metal being interposed between the successive units of the column.

Figure 1:
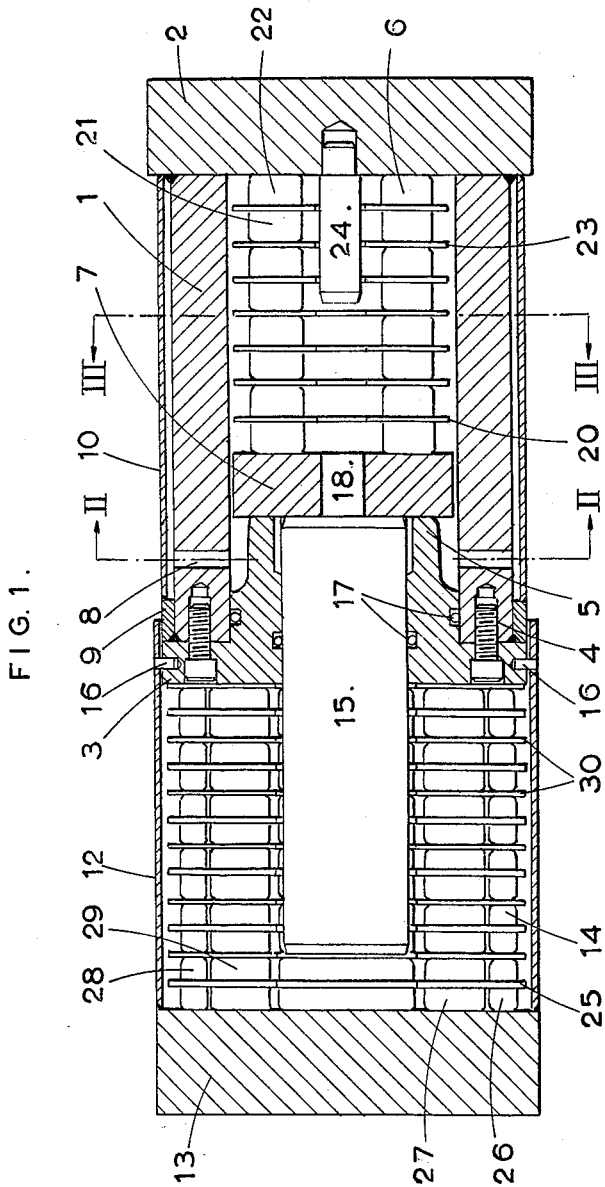
Figure 2:
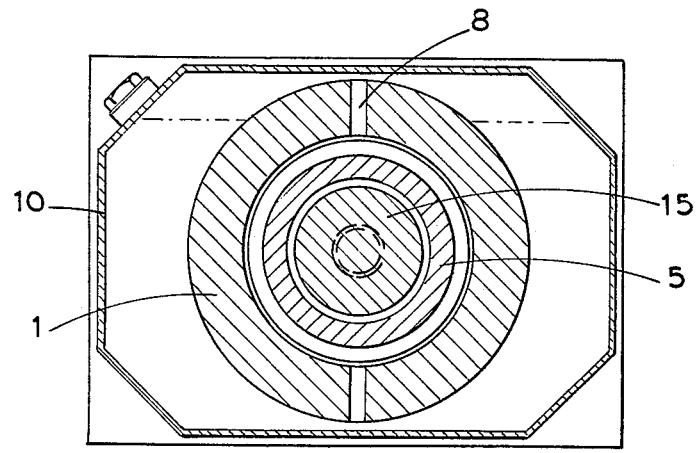
Figure 3:
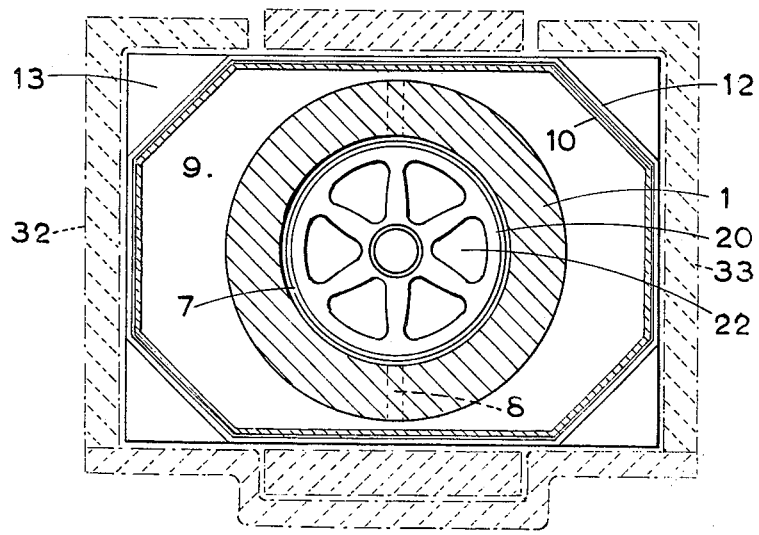
Figure 4:
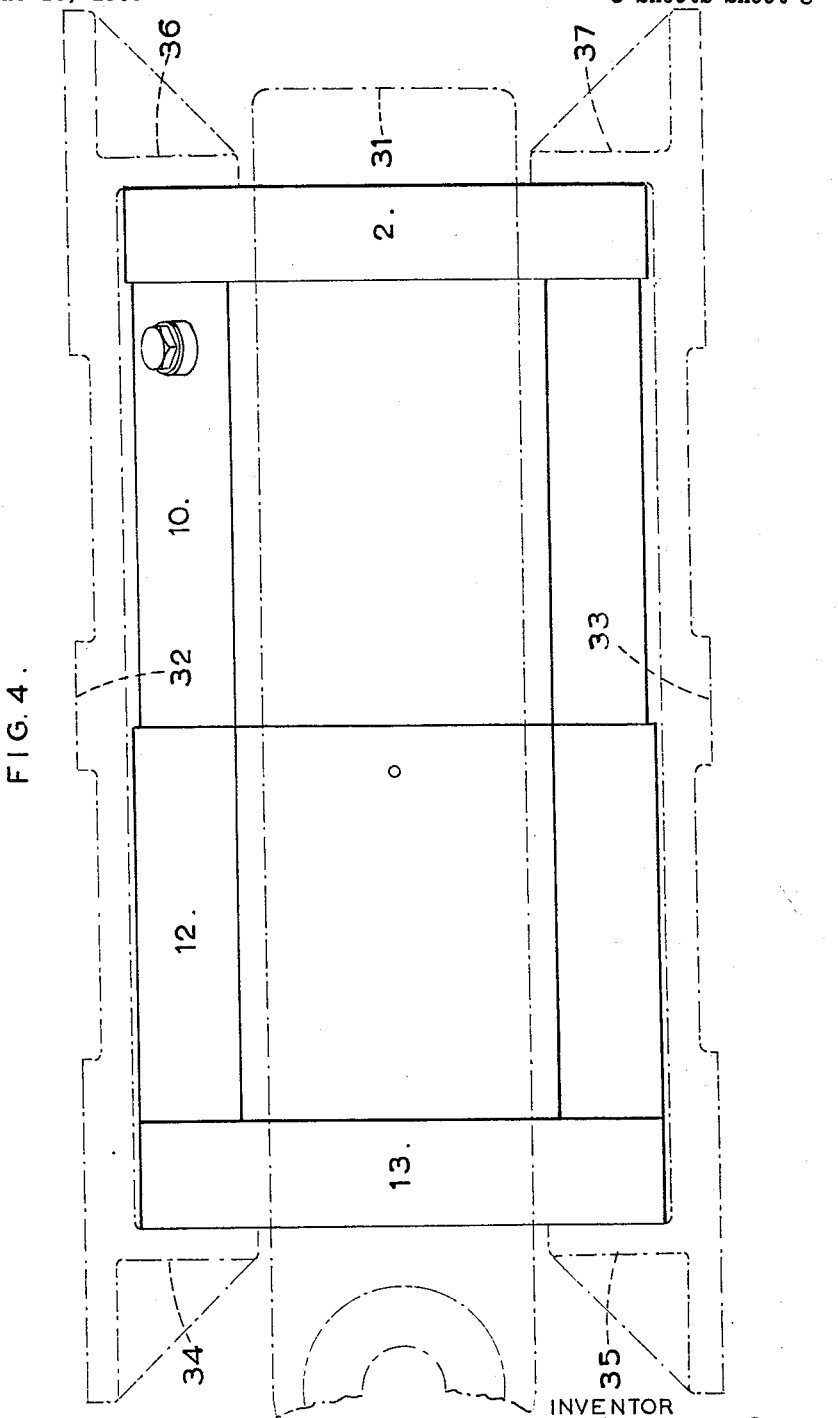

One embodiment of buffing and draft gear according to the invention suitably for operation in a yoke between the centre sills of a vehicle, is shown in the accompanying diagrammatic drawings in which FIGURE 1 is a longitudinal sectional view, and FIGURES 2 and 3, cross sections on the lines II—II and III—III of FIGURE 1 respectively. FIGURE 4 is a plan view.

As shown in FIGURES 1 to 3, a circular cylindrical casing 1 is welded to a rear follower in the form of a rectangular plate 2 at one end and fixed to an intermediate follower in the form of an apertured annular plate 3 with screws 4 at the other end. The intermediate plate has an annular projection 5 within the casing 1. A column of rubber springs 6 is situated within the casing 1 between the rectangular plate 2 and an annular hydraulic piston 7 which abuts with the projection 5 of the intermediate plate 3 when the gear is fully extended. The column of springs 6 is totally immersed in a hydraulic fluid. The outer casing 1 has radial ports or conduits 8 on the low pressure side of the piston 7 which interconnect with a hydraulic reservoir in a shell or container 10 encircling the whole of this section between ringplate 9 on the front of casing 1 and rectangular plate 2. The shell 10 is conveniently of general rectangular form and accommodates a considerable volume of hydraulic fluid.

This section is slidably mounted as a plunger in a similar shell 12 the shape of which corresponds to the external shape of the shell 10. The shell 12 is welded to a front follower 13 in the form of a rectangular buffing plate. A column of rubber springs 14 is situated within the shell 12 between the followers 13 and 3, and disposed around a central spindle 15 which is guided through the central aperture in the intermediate plate 3.

Shear pins 16 are used to hold the shell 12 to provide the initial compression of the rubber spring column 14. These pins shear after the first impact and allow the gear to expand to the limit of the abutments in the wagon underframe. Oil seals 17 ensure fluid-tight sealing.

When the gear is subjected to buffing or draw loads the column of rubber springs 14 is compressed and after an initial stroke depending upon the length of the centre spindle 15, the hydraulic system comes into parallel with the rubber spring column 14 and the spindle 15 pushes the piston 7 through the hydraulic chamber. The clearance between the piston and the cylinder serves as a restricted passage means and determines the amount of hydraulic damping.

In an alternative arrangement the centre spindle 15 is lengthened so that there is no gap between it and the buffing plate 13. This gives a system in which rubber and hydraulic systems are in parallel for the whole stroke.

On recoil, the piston is pushed back by the column of rubber springs 6. If, on recoil, the hydraulic pressure ahead of the piston 7 exceeds the load being applied by the recoil spring column 6, then the piston 7 lifts away from the spindle 15 and fluid can flow through a passageway or aperture 18 in the centre of the piston 7. Thus the pressure on the oil seals is limited to that generated by the rubber recoil spring 6 and this may be predetermined. Thus the separation of the spindle and piston opens passageway 18 and serves as a safety valve on recoil.

A large capacity reservoir in the form of the shell 10 is provided, and since this is on the low pressure side of the system it may be fabricated from sheet steel.

Features of the arrangement illustrated are as follows:
(1) The rubber spring and hydraulic unit operate in parallel for buffing and draw throughout the stroke if the gap between the centre spindle 15 and the buffing plate 13 is zero.
(2) If this gap exists there is an initial rubber stroke followed by the rubber spring and hydraulic unit operating together.
(3) The rear rubber spring acts as the recoil medium for the hydraulic piston.
(4) The separation of the spindle and piston provides a safety valve on recoil to limit the pressure on the oil seals. This separation also ensures that an off-centre shock cannot be transmitted to the piston.
(5) The separation of the spindle from the buffing plate ensuring that off-centre blows cannot be transmitted to the spindle, the guide, and oil seal.
(6) The use of a large rubber spring column behind the buffing plate gives some protection even if the hydraulic portion of the gear fails.

In the buffing and draft gear illustrated, the column of springs 6 is made up of four units each consisting of a metal plate 20 having bodies of rubber 21 and 22 projecting at each face, the bodies at the opposite faces being united by rubber passing through perforations in the plate, and separating plates 23 are interposed between the successive units of the column. 24 is a central guide.

The column 14 is made up of six units each comprising a plate 25 with two concentric annular rings 26 and 27 of rubber at one face and two similar rings 28 and 29 at the other. 30 represents separating plates between the successive units.

In FIGURES 3 and 4, the central buffing and draft gear is shown in a vertical yoke 31 between castings 32 and 33 providing front abutments 34 and 35 for the front follower 13 and rear abutments 36 and 37 for the rear follower 2, these castings being adapted for securement to the centre sills of a vehicle.

What I claim is:

1. Central buffing and draft gear including spaced front, intermediate and rear followers, a front column of rubber spring units between the front and intermediate followers, a cylindrical casing extending between and connected to the intermediate and rear followers, a piston movably mounted in said casing, restricted passage means to control flow of fluid between opposite faces of the piston, a central spindle passing through the said front column of rubber spring units and through an aperture in the intermediate follower whereby said central spindle may engage said piston, a second column of rubber spring units between the piston and the rear follower and serving as resilient means to effect recoil of the piston, a closed shell surrounding and spaced from the cylindrical casing, the space between said closed shell and cylindrical casing serving as a reservoir for hydraulic fluid, means connecting said shell to said casing and closing said space, and said cylindrical casing being provided with passage means whereby fluid may flow between the interior of said cylinder and said reservoir.

2. Central buffing and draft gear according to claim 1 including also a resilient cushion located between the front follower and the spindle.

3. Central buffing and draft gear according to claim 1 wherein the intermediate follower has a rearward annular projection extending into the cylindrical casing and which serves as a forward limit stop for the piston, and said passage means comprising radial ports in said casing around said projection communicating with the reservoir.

4. Central buffing or draft gear according to claim 1 wherein the central spindle operated by the front follower is separate from the hydraulic piston and the hydraulic piston has a passageway therethrough alternatively opened and closed by said spindle so that the spindle acts as a safety valve on recoil, while also ensuring that off centre shock is not transmitted to the piston.

References Cited in the file of this patent
UNITED STATES PATENTS

| | | |
|---|---|---|
| 776,390 | Gallagher | Nov. 20, 1904 |
| 1,955,349 | Stevens | Apr. 17, 1934 |
| 2,451,569 | Lounsbury | Oct. 19, 1948 |
| 2,733,916 | Dentler | Feb. 7, 1956 |
| 2,781,135 | Spence et al. | Feb. 12, 1957 |
| 2,914,195 | Pawling | Nov. 24, 1959 |